(12) United States Patent
Yamazaki

(10) Patent No.: US 8,547,565 B2
(45) Date of Patent: Oct. 1, 2013

(54) METHOD AND APPARATUS FOR IMAGE PROCESSING WITH STATUS NOTIFICATION

(75) Inventor: Yoji Yamazaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 701 days.

(21) Appl. No.: 12/659,779

(22) Filed: Mar. 22, 2010

(65) Prior Publication Data

US 2010/0238479 A1 Sep. 23, 2010

(30) Foreign Application Priority Data

Mar. 23, 2009 (JP) .................................. 2009-071013

(51) Int. Cl.
*G06K 15/00* (2006.01)

(52) U.S. Cl.
USPC ....... 358/1.14; 358/1.13; 358/1.15; 358/1.16; 358/400; 358/401; 358/402; 358/405; 358/437; 455/403; 455/413; 455/414.1; 455/511; 455/67.7

(58) Field of Classification Search
None
See application file for complete search history.

(56) References Cited

U.S. PATENT DOCUMENTS

| | | | |
|---|---|---|---|
| 6,734,985 | B1 | 5/2004 | Ochiai |
| 2002/0036797 | A1* | 3/2002 | Yamamoto ................... 358/1.15 |
| 2004/0085573 | A1* | 5/2004 | Aidinejad ..................... 358/1.15 |
| 2005/0113025 | A1* | 5/2005 | Akamatsu et al. ........... 455/41.3 |
| 2007/0206210 | A1* | 9/2007 | Miyazaki et al. ............ 358/1.14 |
| 2007/0297001 | A1* | 12/2007 | Podl .............................. 358/1.15 |
| 2008/0240827 | A1* | 10/2008 | Yamazaki ...................... 400/73 |

FOREIGN PATENT DOCUMENTS

| | | |
|---|---|---|
| EP | 1939722 A2 | 7/2008 |
| JP | 11-194901 A | 7/1999 |
| JP | 2003-348283 A | 12/2003 |
| JP | 2004-048513 A | 2/2004 |
| JP | 2005-045551 A | 2/2005 |
| JP | 2005045551 A * | 2/2005 |
| JP | 2005-236346 A | 9/2005 |
| JP | 2006-011588 A | 1/2006 |
| JP | 2007-286882 A | 11/2007 |

OTHER PUBLICATIONS

Machine Translation of JP 2005-045551, Kaminogo et al., Feb. 2005.*

* cited by examiner

*Primary Examiner* — Miya J Cato
(74) *Attorney, Agent, or Firm* — Rabin & Berdo, P.C.

(57) ABSTRACT

An image processing apparatus is capable of transmitting its status information to a remote apparatus. A job receiving section receives an image outputting job from an external apparatus. An image outputting section outputs an image based on the image outputting job. A notification destination information memory stores notification destination information including a first notification destination for a first output device and a second notification destination for a second output device. A communication section sends status information about the image outputting section to the first and second notification destinations. When the image outputting section is outputting the image, if the status information is outputted from the image outputting section, the communication section sends the status information to the first output device. If job receiving section receives another image outputting job when the status information exists, the communication section sends the status information to the second output device.

13 Claims, 12 Drawing Sheets

FIG.5

| USER NAME | IP ADDRESS |
|---|---|
| A | 199.32.233.10 |
| B | 154.32.113.18 |
| C | 169.41.15.101 |
| D | 75.82.151.83 |
| ..... | ..... |

FIG.6

| OUTPUT DESTINATION | NOTIFICATION DESTINATION | |
|---|---|---|
| USER NAME | FIRST NOTIFICATION DESTINATION | SECOND NOTIFICATION DESTINATION |
| A | TEL : x123-xxxx | TEL : x456-xxxx |
| B | TEL : x321-xxxx | TEL : x774-xxxx |
| C | TEL : x654-xxxx | TEL : x333-xxxx |
| D | TEL : x987-xxxx | TEL : x789-xxxx |
| ..... | ..... | ..... |

FIG.7

| USER NAME | MALFUNCTION OCCURRENCE INFORMATION | REMEDY INFORMATION | STATUS INFORMATION | FIRST NOTIFICATION | SECOND NOTIFICATION |
|---|---|---|---|---|---|
| C | YES | YES | PAPER JAM | YES | NO |
| C | NO | - | PRINTING COMPLETED | YES | NO |
| A | NO | - | PRINTING COMPLETED | YES | NO |
| A | YES | NO | PAPER JAM | YES | NO |

FIG.8

| STATUS CODE | STATUS INFORMATION |
|---|---|
| 1 | PAPER JAM |
| 2 | TONER OUT |
| 3 | PAPER OUT |
| 4 | DRUM LIFETIME |
| 5 | PRINTING COMPLETED |
| 6 | REMEDY FROM MALFUNCTION |

Rows 1–4: MALFUNCTION OCCURRENCE INFORMATION
Row 5: = PRINT JOB COMPLETION INFORMATION
Row 6: = REMEDY INFORMATION

FIG.9

| STATUS CODE | MESSAGE |
|---|---|
| 1 | PAPER JAM OCCURRED |
| 2 | TONER EXHAUSTED |
| 3 | PAPER EXHAUSTED |
| 4 | DRUM LIFETIME |
| 5 | PRINT JOB COMPLETED |

FIG.20

| OPUTPUT DESTINATION | NOTIFICATION DESTINATION | |
|---|---|---|
| USER NAME | FIRST NOTIFICATION DESTINATION | SECOND NOTIFICATION DESTINATION |
| A | TEL : x123-xxxx | VOICE OUTPUT |
| B | TEL : x321-xxxx | VOICE OUTPUT |
| C | TEL : x654-xxxx | VOICE OUTPUT |
| D | TEL : x987-xxxx | VOICE OUTPUT |
| ⋮ | ⋮ | ⋮ |

FIG.21

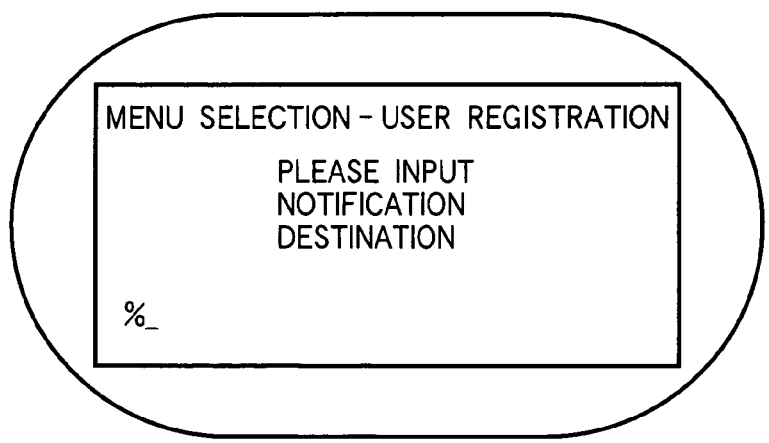

MENU SELECTION - USER REGISTRATION

PLEASE INPUT NOTIFICATION DESTINATION

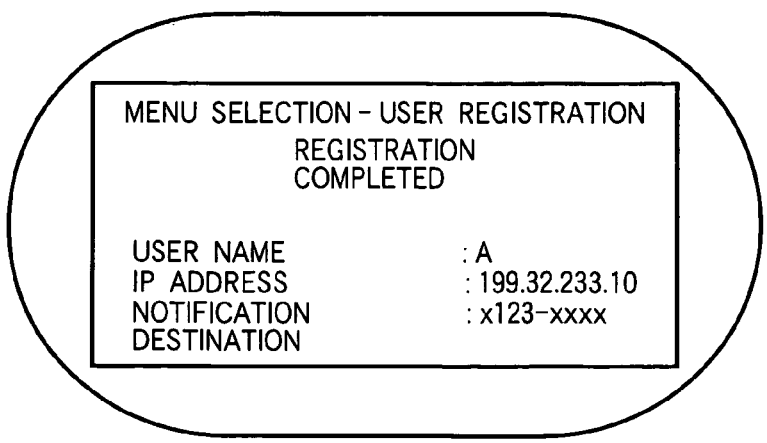

MENU SELECTION - USER REGISTRATION
REGISTRATION COMPLETED

USER NAME : A
IP ADDRESS : 199.32.233.10
NOTIFICATION DESTINATION : x123-xxxx

METHOD AND APPARATUS FOR IMAGE PROCESSING WITH STATUS NOTIFICATION

BACKGROUND OF THE INVENTION

Field of the Invention

The present invention relates to an image processing apparatus that executes an image processing job, and outputs the processed image, the image processing apparatus including a communication section for notifying remote equipment of the status of the image processing section.

A conventional image processing apparatus transmits a notification to an external apparatus upon completion of the image processing job for printing. The image processing apparatus holds a user's address to which the notification of completion of the print processing job should be transmitted. When a malfunction such as paper-jam occurs in the middle of a printing process, the printing process is halted, and then information in the form of audio data indicative of the occurrence of the malfunction is sent to a notice destination (e.g., an external apparatus) via a LAN, or to a cellular phone over a telephone line (see Japanese Patent Application Laid-Open No. 2003-348283, paragraphs [0031]-[0038] and FIG. 2).

It is quite often that a user who receives an image processing job leaves the external apparatus for a short time before the image processing job completes, or the user's cellular phone is busy, so that the user does not become aware of the notification and therefore the malfunction is left unattended. Thus, even if another image processing job is received from another user, the image processing still remains halted, causing inconvenience to many other users and preventing efficient utilization of the image processing apparatus.

SUMMARY OF THE INVENTION

An object of the invention is to provide an image processing apparatus in which if a malfunction is not remedied after sending status information indicative of the occurrence of a malfunction to a first output destination, the status information is sent to a second output destination so that a user is reliably notified of the malfunction.

Another object of the invention is to minimize the period of time during which the printing is interrupted, thereby enabling the image processing apparatus to perform printing more efficiently.

Still another object of the invention is to avoid delay of remedy from the malfunction and inconvenience to the users of other print jobs received during the malfunction.

An image processing apparatus is capable of transmitting its status information to a remote apparatus. A job receiving section receives an image outputting job from an external apparatus. An image outputting section outputs an image based on the image outputting job. A notification destination information memory stores notification destination information including a first notification destination for a first device and a second notification destination for a second device. A communication section sends status information about the image outputting section to the first notification destination and the second notification destination. When the image outputting section is outputting the image, if the status information is outputted from the image outputting section, the communication section sends the status information to the first device. If job receiving section receives another image outputting job when the status information exists, the communication section sends the status information to the second device.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 5 illustrates user information;

FIG. 6 illustrates destination information;

FIG. 7 illustrates status information;

FIG. 8 illustrates a status code table;

FIG. 9 illustrates a message table;

FIG. 20 illustrates a second notification destination inputting screen;

FIG. 21 illustrates a registration displaying screen of a second embodiment; and FIG. 22 illustrates destination information.

DETAILED DESCRIPTION OF THE INVENTION

First Embodiment

Figure 1:
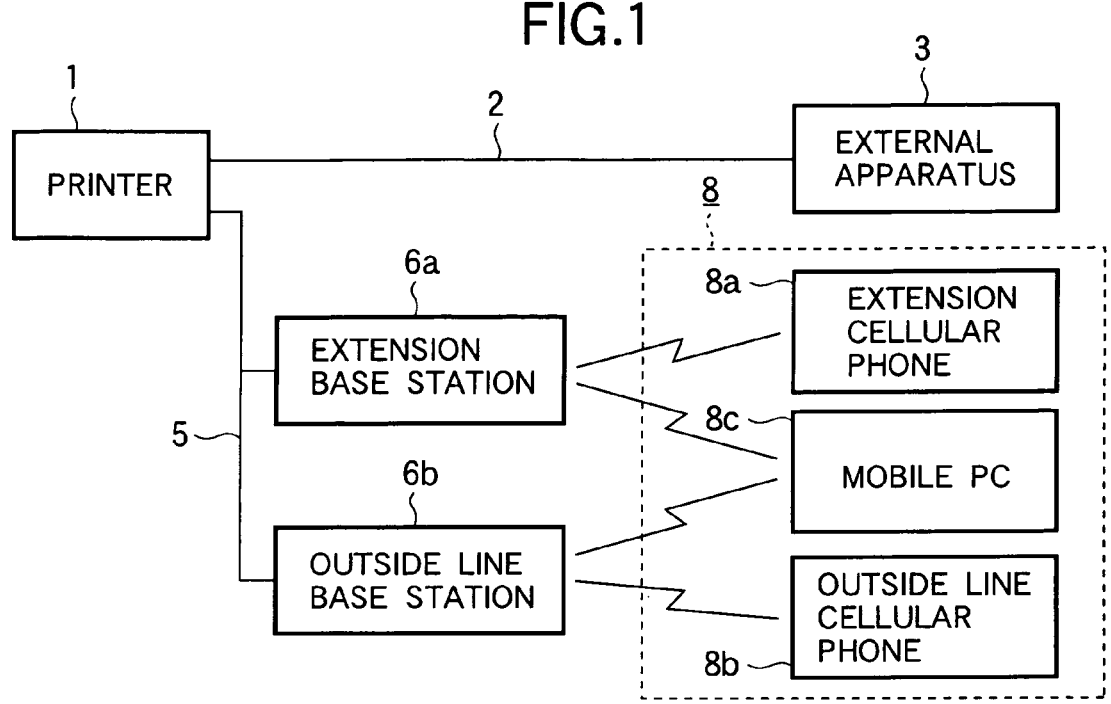
FIG. 1 illustrates an image processing system of a first embodiment.

FIG. 1 illustrates an image processing system of a first embodiment.

Figure 2:
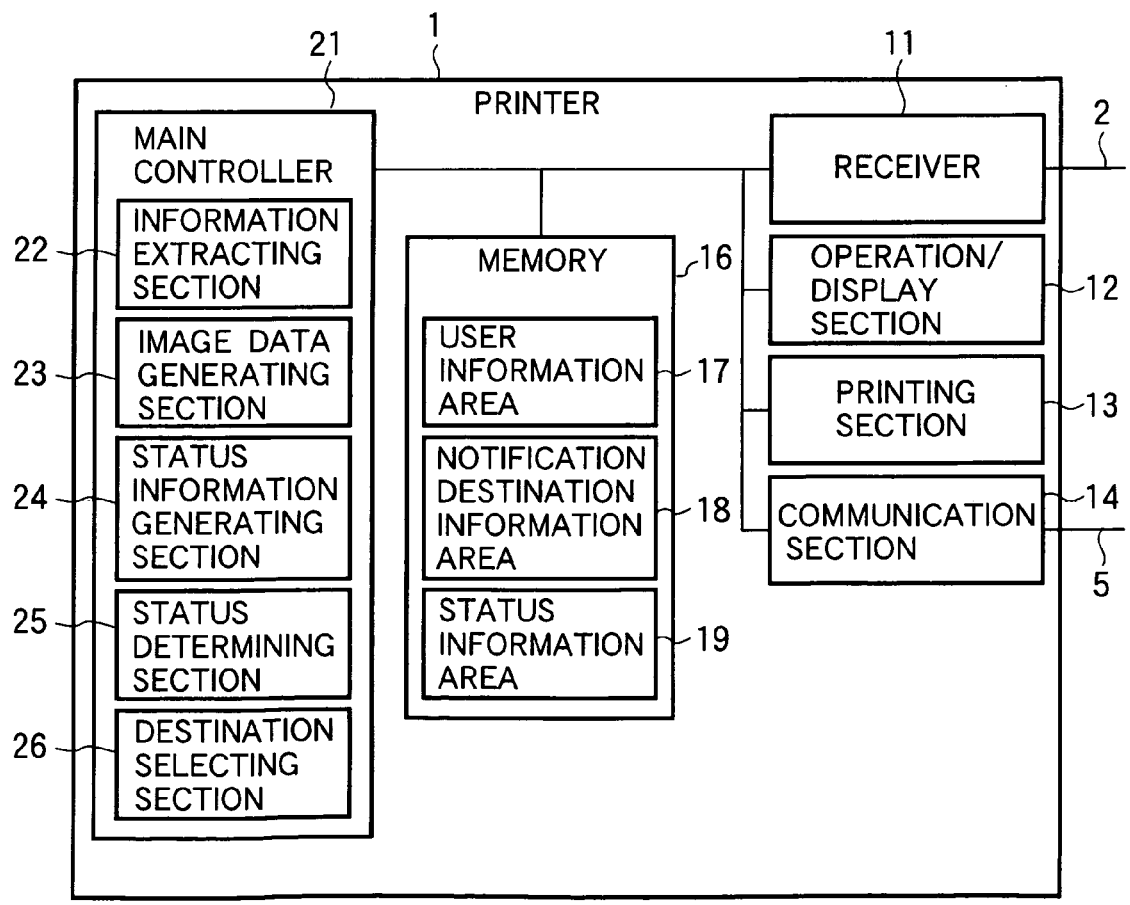
FIG. 2 is a block diagram illustrating the configuration of a printer of the first embodiment.

FIG. 2 is a block diagram illustrating the'configuration of a printer of the first embodiment.

Figure 3:
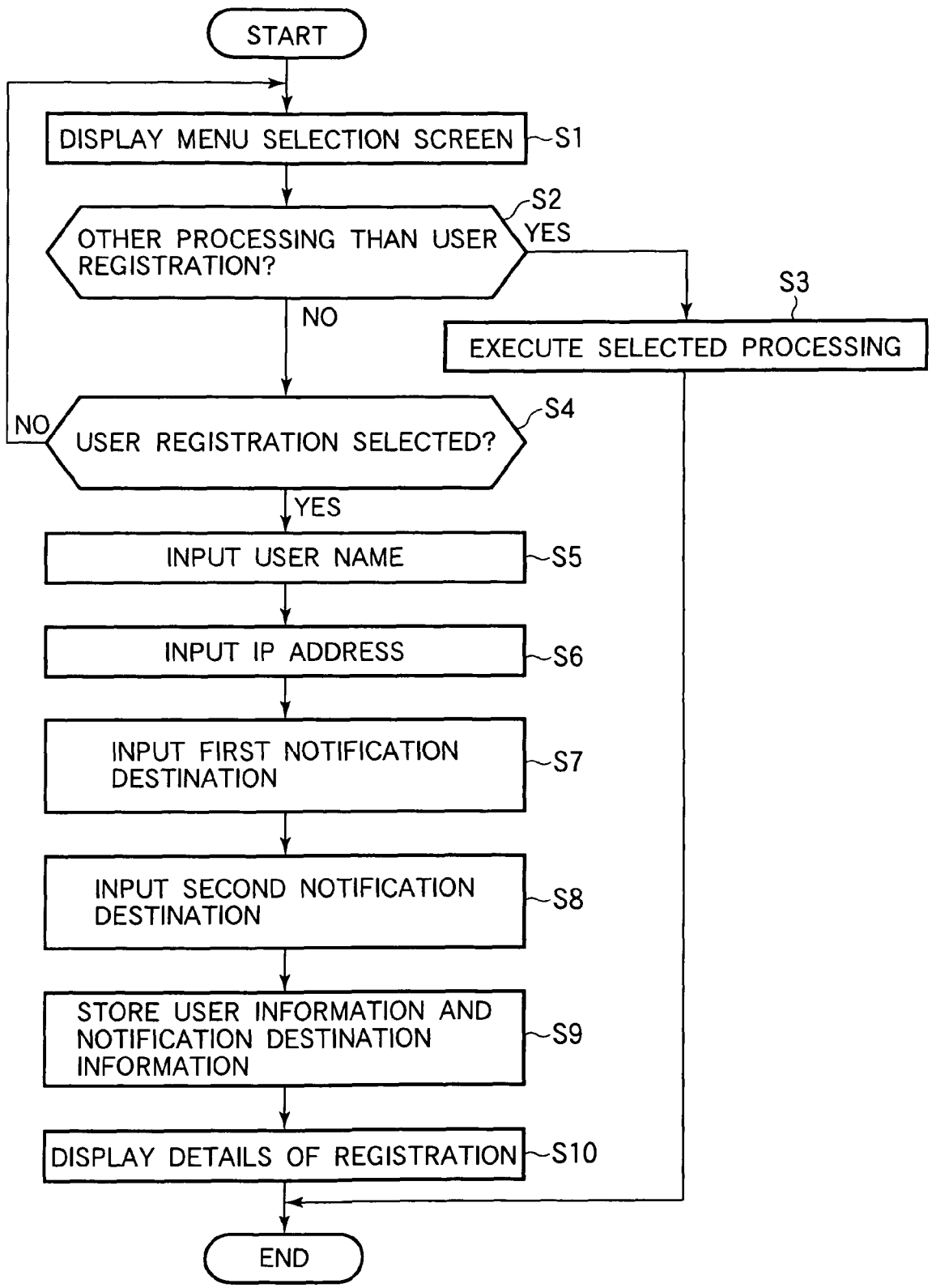
FIG. 3 is a flowchart illustrating a user registration processing of the first embodiment.

FIG. 3 is a flowchart illustrating a user registration processing of the first embodiment.

Figure 4:
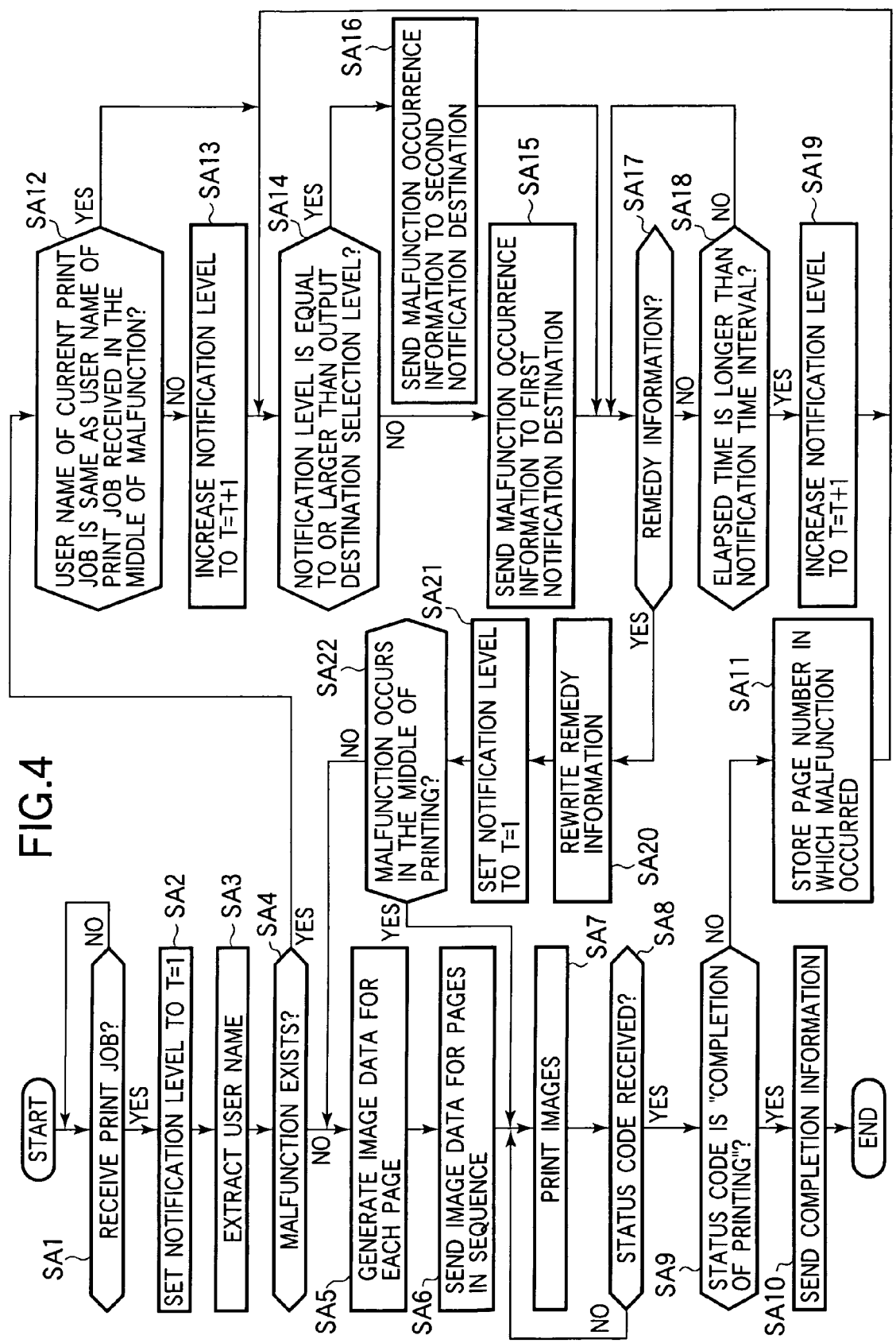
FIG. 4 is a flowchart illustrating a status information notification processing.

FIG. 4 is a flowchart illustrating a status information notification processing.

Base stations of the present invention communicate with mobile communication units including extension cellular phones, outside cellular phones, and mobile PCs. For convenience of explanation, the invention will be described in terms of communication between the base stations and cellular phones.

Referring to FIG. 1, a printer 1 serves as an image processing apparatus and is connected to an external apparatus 3, for example, a personal computer via a network 2, for example, a local area network (LAN).

The printer 1 is connected via a telephone line 5 to an extension base station 6a as a first base station and an outside line base station 6b as a second base station, and is capable of communicating with a mobile communication unit 8 including an extension cellular phone 8a, an outside cellular phone 8b, and a mobile PC 8c by wireless communication.

Referring to FIG. 2, a job receiving section or a receiver 11 receives signals and data from the external apparatus 3 via the network 2. The signals and data includes a print job that contains print data for each page, a print command for specifying portrait orientation or landscape orientation, and an IP address for the external apparatus 3 that transmits the print job. The received print job is sent to the respective sections in the printer 1.

The operation/display section 12 includes a displaying means as a display screen in the form of a liquid crystal display (LCD) and/or a light emitting diode (LED), and an inputting means in the form of a ten-key pad or arrow keys with which the user inputs various types of inputs. The displaying means displays various input screens: menu selection screens for the user to select desired menus, inputting screens for the user to input various inputs, and screens for prompting the user to perform the necessary operations.

A printing section 13 includes four print engines, a transfer belt, and a fixing section. The four print engines form black, yellow, magenta and cyan images, respectively. Each print engine includes a photoconductive drum and an LED head, and prints an image of a corresponding image on the paper.

A communication section 14 transmits status information in the form of voice data to a remote receiver, i.e., the extension cellular phone 8a or the outside line cellular phone 8b via a telephone line 5, an extension base station 6a, or an outside line base station 6b. The communication section 14 also transmits status information in the form of an email message to the remote receivers, for example, the extension cellular phone 8a or the outside line cellular phone via a telephone line 5, an extension base station 6a, or an outside line base station 6b.

A memory 16 in the printer 1 holds a print job executing program which is executed by a later described main controller 21, and various data for executing the print job executing program, and various results obtained by the main controller 21.

The print job executing program is executed to carry out, for example, the user registration processing illustrated with reference to FIG. 3 and the status information notification processing illustrated with reference to FIG. 4.

The memory 16 includes a user information area 17, a notification destination information area 18, and a status information area 19. The user information area 17 holds user information, for example, the IP address of the external apparatus 3 used by the user. The notification destination information area 18 holds destination information as shown in FIG. 6: a first notification destination and a second notification destination. The first notification destination is the extension number of the extension cellular phone 8a carried by the user. The second destination is the outside line number of the outside line cellular phone 8b carried by the user. The status information area 19 holds the status information (FIG. 7) associated with status codes outputted from the printing section 13, the user name of a user who sent the print job associated with the status information, the presence or absence of malfunction information, malfunction remedy information indicative of remedy/non-remedy, a first notification (YES/NO) indicative of whether a notification has been sent to the first notification destination, and a second notification (YES/NO) indicative of whether a notification has been sent to the second notification destination.

FIG. 8 illustrates a status code table. FIG. 9 illustrates a message table. The memory 16 holds a status code table as illustrated in FIG. 8, and a message table as illustrated in FIG. 9. The status code table has status codes outputted from the printing section 13 and associated status information. The message table lists the status codes and associated status information.

The status information includes malfunction occurrence information indicative of the occurrence of paper jam (code #1), toner-out (code #2), paper-out (code #3), and an upper limit of the number of printed pages or drum lifetime (code #4), print job completion information indicative of completion of a print job (code #5), and remedy information indicative of remedy from malfunction (code #6).

The memory 16 includes a notification level area that counts the level of a notification level T indicative of the level of urgency of the malfunction occurrence information. More specifically, the notification level area holds an output destination selecting level ("2" in the first embodiment) and a notification time interval between adjacent notifications (for example, 3 minutes in the first embodiment). The destination selecting level is used to determine a destination to which the notification should be sent. The notification time interval is a waiting time from when malfunction occurrence information is notified to a destination until re-notification of the malfunction occurrence information to the same destination.

The main controller 21 controls the respective sections in the printer 1 to carry out, for example, the user registration processing and the status information notification processing.

The main controller 21 includes an information extracting section 22, an image data generating section 23, a status information generating section 24, a status determining section 25, and a destination selecting section 26, which are all implemented in software, i.e., a printing program.

The information extracting section 22 extracts a user name which corresponds to the IP address, from the print job received in the receiver 1. The image data generating section 23 produces image data for each page based on the print data contained in the received print job. The status information generating section 24 extracts the status information from a status code outputted from the printing section 13. The status information generating section 24 produces, based on a message contained in the status information, voice data used for telephone or message data (e.g., icons and/or characters) for email. The status determining section 25 determines the status of the printer 1 based on the status information received from the status information generating section 24 and the user name received from the information extracting section 22. Based on the determination made by the status determining section 25, the destination selecting section 26 selects a destination to which the status information should be notified.

{User Registration Processing}

Figure 10:
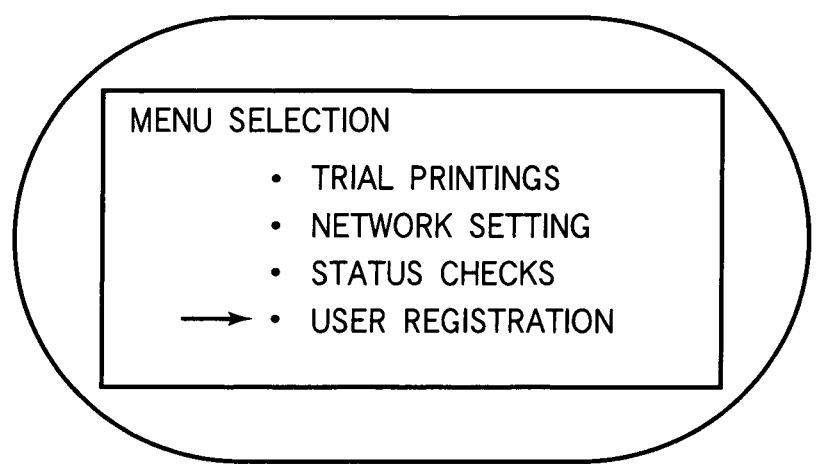
FIG. 10 illustrates a menu selection screen.
Figure 11:
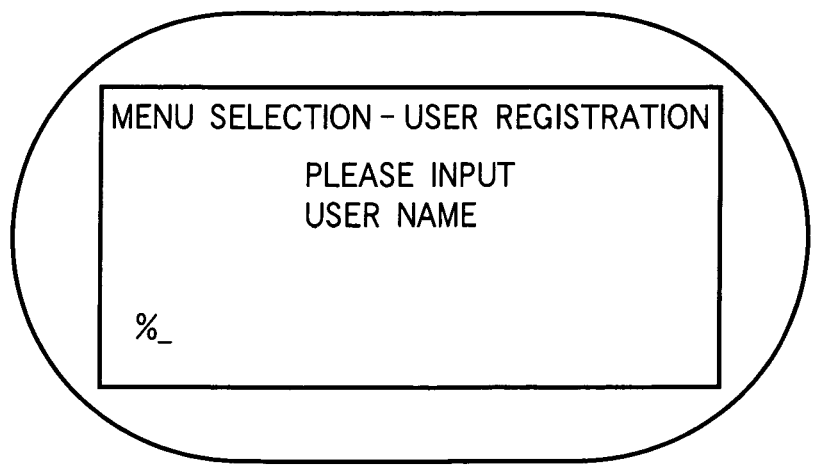
FIG. 11 illustrates a user name inputting screen.
Figure 12:
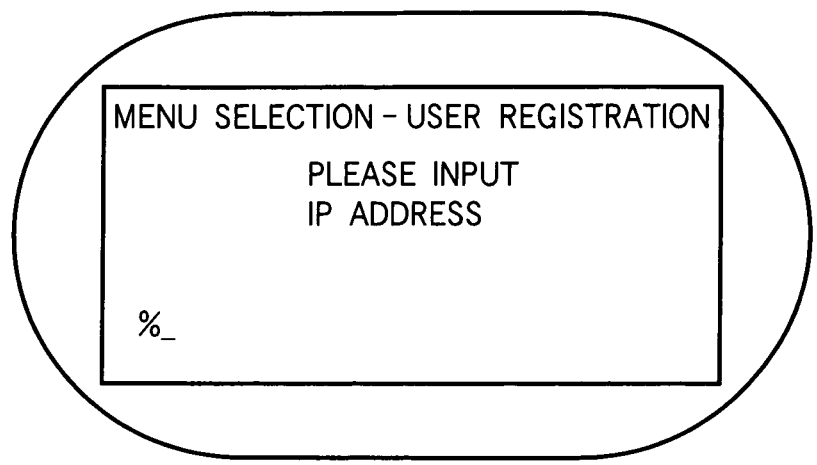
FIG. 12 illustrates an IP address inputting screen.
Figure 13:
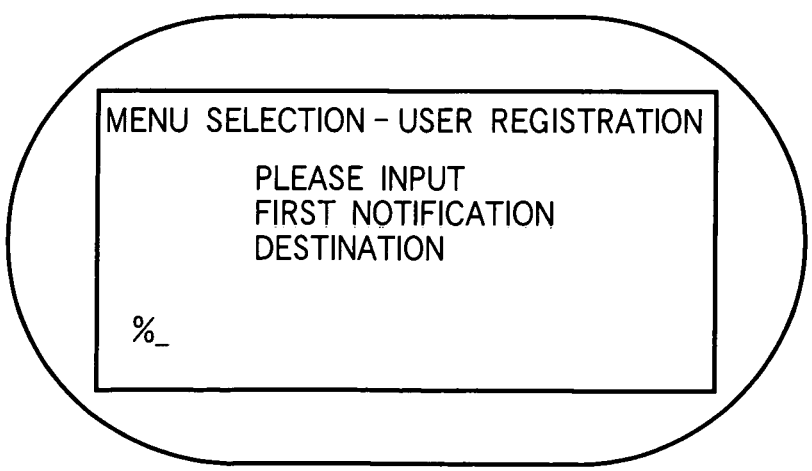
FIG. 13 illustrates a first notification destination inputting screen.
Figure 14:
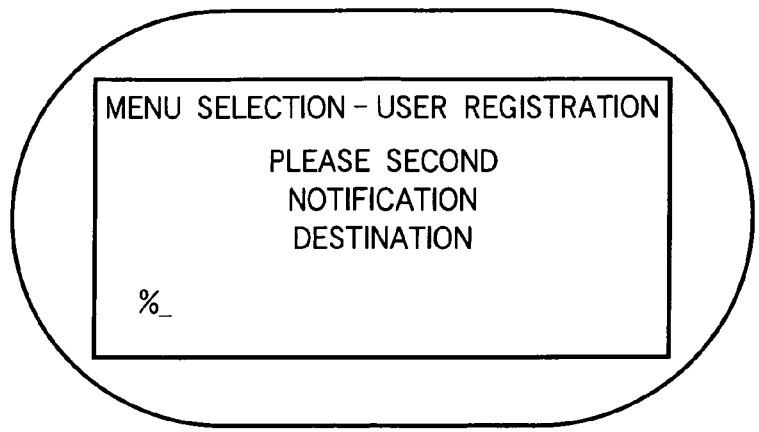
FIG. 14 illustrates a second notification destination inputting screen.
Figure 15:
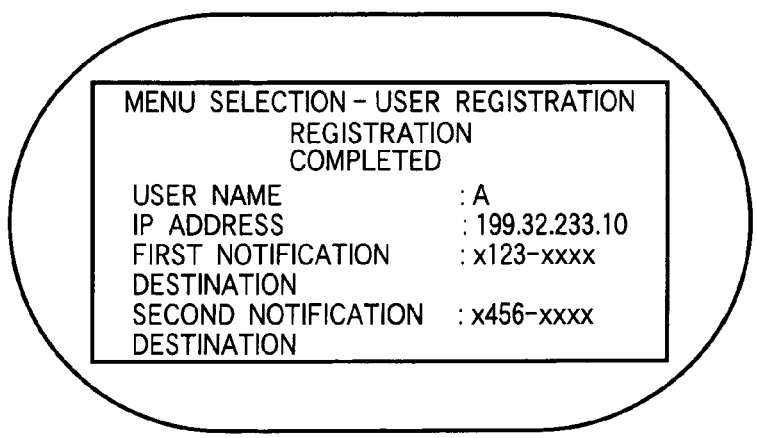
FIG. 15 illustrates a registration displaying screen of a first embodiment.

The user registration processing of the first embodiment will be described with reference to the flowchart illustrated in FIG. 3. FIG. 10 illustrates a menu selection screen. FIG. 11 illustrates a user name inputting screen. FIG. 12 illustrates an IP address inputting screen. FIG. 13 illustrates a first notification destination inputting screen. FIG. 14 illustrates a second notification destination inputting screen. FIG. 15 illustrates a registration displaying screen of a first embodiment.

Upon power-up of the printer 1, the printing program stored in the memory 16 of the printer 1 is automatically invoked.

Step S1: After the printing program is invoked, the main controller 21 causes the display of the operation/display section 12 to display the menu selection screen shown in FIG. 10, and then waits for the user's selection.

The menu selection screen contains conventional menus, for example, "Trial printing", "Network settings", and "Status checks" as well as "User registration" for registering information unique to a user who uses the printer 1.

A user selects the "User Registration" from among the menus displayed on the menu selection screen by using an input key on the operation/display section 12.

Step S2. If the selected menu is a menu other than the "User Registration," the main controller 21 proceeds to step S3. If NO, the program proceeds to S4.

Step S3: The main controller 21 executes the selected processing in a well known manner in the art.

Step S4: A check is made to determine whether the "User Registration" is selected. If the selected menu is not "User registration," the program jumps back to step S1 where the main controller 21 displays the menu selection screen on the display unit of the operation/display section 12.

If the selected menu is "User Registration" (YES at S4), the controller 21 proceeds to step S5.

Step S5: The controller 21 displays a "User Name inputting Screen" as shown in FIG. 11 on the operation/display section 12. The "User Name inputting Screen" includes a message (e.g., "Please input your user's name") prompting the user to input a user name and an area in which an inputted user name appears. The user operates the input keys on the operation/display section 12 to input the user name.

S6: The controller 21 controls the operation/display section 12 to display a message (e.g., "Please input your IP address") (FIG. 12) prompting the user to input an IP address and an area in which an inputted IP address appears. The user operates the input keys on the operation/display section 12 to input the IP address.

S7: The controller 21 displays a message (e.g., "Please input first notification destination") (FIG. 13) prompting the user to input the first notification destination and an area in which the inputted first notification destination appears. The user operates the input keys on the controls/operation section 12 to input the extension number of the extension cellular phone 8a which is the first notification destination.

S8: The controller 21 displays a message prompting the user to input the second notification destination and an area in which the inputted second notification destination appears. The user operates the input keys on the operation/display 12 to input the outside line number of the outside line cellular phone 8b which is the second notification destination.

S9: The controller 21 stores the user information or the inputted user name and IP address into the user information area 17 of the memory 16, and the notification destination information which contains both the inputted user name and first notification destination or extension number and the second notification destination or outside line number into the notification destination information area 18 of the memory 16.

S10: Then, the controller 21 controls the operation/display section 12 to display a registration displaying screen in which the details of the registration as shown in FIG. 15 appear. Then, the user confirms the displayed contents by pressing an input key on the operation/display section 12.

The controller 21 completes the user registration processing and then returns to step S1 where the menu selection screen is again displayed, and the controller 21 enters a standby mode.

As described above, the user registration processing of the first embodiment is performed.

[Status Information Notification Processing]

The status information notification processing of the first embodiment will be described with reference to FIG. 4. FIG. 5 illustrates user information; FIG. 6 illustrates destination information. FIG. 7 illustrates status information.

Step SA1: The main controller 21 invokes the printing program and waits for an incoming print job which will be received from the external apparatus 3. The main controller 21 waits until a receiver 11 receives a print job. Upon reception of a print job, the main controller proceeds to step SA2.

Any additional print jobs may be received promptly even when the preceding print job is being processed.

Step SA2: When the receiver 11 has received a print job, the main controller 21 stores the received print job into the memory 16 and then sets the count of the notification level area of the memory 16 to "1." More specifically, the notification level T of the malfunction occurrence information is initialized to "1."

Step SA3: After initialization of the notification level T, the main controller 21 controls the information extracting section 22 to read the IP address contained in the print job stored in the memory 16, and extracts the user name associated with the IP address from the registered user information (FIG. 5) stored in the user information storage section 17 of the memory 16.

Step SA4: Then, the main controller 21 controls the status determining section 25 to search the items of status information in the status information area 19 of the memory 16, thereby determining whether a malfunction exists currently. If a malfunction exists (i.e., the malfunction occurrence information is "YES") and the remedy information is "NO", the main controller 21 proceeds to step SA 12. If no malfunction exists, the main controller 21 proceeds to step SA5.

Step SA5: After determining that no malfunction exists, the main controller 21 controls the image data generating section 23 to generate image data on a page-by-page basis based on the print data and a print command which are contained in the print job held in the memory 16.

Step SA6: Then, the main controller 21 stores the image data produced by the image data generating section 23 into the memory 16, and sends the image data to the printing section 13.

Step SA7: The main controller 21 controls the printing section 13 to start printing of the image data on the paper.

Step SA8: After initiation of printing, the main controller 21 waits for a status code from the printing section 13. Upon reception of a status code, the main controller 21 proceeds to step SA9.

The main controller 21 executes steps SA7 and SA8, repeating alternately performing printing and then waiting for a status code.

Step SA9: A check is made to determine whether the status code is "completion of printing." If a status code is outputted from the printing section 13, the main controller 21 controls the status information generating section 24 to search the status code table (FIG. 8) in the memory 16 by using the status code. If the received status code is "5" indicative of the print job completion information, the main controller 21 proceeds to step SA10.

If, at step SA9, the received status code is one of "1," "2," "3," and "4" which are the malfunction occurrence information, the main controller 21 proceeds to step SA11.

Step SA10: The main controller 21 controls the status information generating section 24 to extract a message "Print job has been completed" from the message table (FIG. 9) by using the status code, and then controls the operation/display section 12 to display the message while also controlling the status information generating section 24 to produce the voice data for telephone based on the message. Then, the main controller 21 controls the destination selecting section 26 to search the notification destination information (FIG. 6) held in the notification destination information area 18 of the memory 16 for extracting the extension number which is the first notification destination of the user, so that the communication section 14 sends the voice data indicative of completion of printing to the extension cellular phone 8a, which is a first device through which the malfunction occurrence information is outputted to an output destination, i.e., the user, over the telephone line via the extension base station 6a. In the specification, the term output destination covers a user and the term notification destination covers, for example, a telephone number of the user's cellular phone (e.g., voice outputting section 35) and/or an email address of the user's cellular phone or mobile PC (FIG. 20).

The main controller 21 writes, into the status information area 19 of the memory 16, the user name of the print job, malfunction information "NO," remedy information "-," status information "printing completed," first notification "YES," second notification "NO," thereby completing the status information notification processing for the received print job.

When there is no malfunction, the status information notification processing is performed as described above.

When another print job is received and the malfunction has not remedied yet, the following is the status information notification processing is performed.

Step SA11: If the status code indicates malfunction information at step SA9, the program proceeds to step SA11 where the main controller 21 controls the status information generating section 24 to extract a message "Paper jam occurred," which is one of the items of malfunction information, from the message table of the memory 16 (FIG. 9). Then, the controller 21 controls the operation/display section 12 to display the message, and stores the message into the memory 16 the page number of a page in which malfunction occurred in the middle of printing. Then, the main controller 21 stores, into the status information area 19 of the memory 16, the status information, for example, the user name of the print job, malfunction information "YES," remedy information "NO," status information "Paper jam," first notification "NO," and second notification "NO."

Step SA12: If a malfunction exists at step SA4 (YES at SA4), the main controller 21 controls the status determining section 25 to read the user name, extracted from the received print job in which the malfunction has occurred, from the status information stored in the status information area 19. Then, the main controller 21 compares the current user name with a user name (referred to "user name of other print job" hereinafter) extracted at step SA3 from a print job received in the middle of the malfunction. If the user names coincide, the main controller 21 determines that the users are the same person, and proceeds to step SA13.

If they do not coincide, it is determined that the user of the print job currently in which the malfunction has occurred is different from the other user, and the main controller 21 proceeds to step SA14.

Step SA13: The main controller 21 adds "1" to the current notification level T held in the notification level area in the memory 16, thereby increasing the urgency of the notification level T of the malfunction occurrence information. Then, the main controller 21 proceeds to step SA14.

Step SA14: The main controller 21 compares the notification level T held in the notification level area with an output destination selection level ("2" in the first embodiment) held in the memory 16. If the notification level T is smaller than the output destination selection level, the main controller 21 proceeds to step SA15. If the notification level T is equal to or larger than the output destination selection level, the main controller 21 proceeds to step SA16.

As described above, if a malfunction occurs in the middle of printing, or if the user name of the print job in which the malfunction has occurred is the same as the user name of other print job, the notification level T remains "1", i.e., initial value, and therefore the main controller 21 proceeds to step SA15. If the user name of the print job in which malfunction has occurred is not the same as the user name of other print job, the notification level T is increased to "2" and therefore the controller 21 proceeds to step SA16.

Step SA15: The main controller 21 produces voice data from the message extracted by the status information generating section 24 at step SA11 or the message associated with the status information of the print job in which malfunction has occurred. Then, the main controller 21 controls the destination selecting section 26 to search the notification destination information (FIG. 6) held in the notification destination information area 18, thereby extracting the extension number which is the first notification destination of the user of the print job in which the malfunction has occurred. The extension number is used as a destination when the communication section 14 transmits the malfunction occurrence information in the form of the voice data indicative of the occurrence of malfunction to the extension cellular phone (first notification destination) 8a via the extension base station 6a. Then, the main controller 21 rewrites the first notification "NO" of the status information stored in the status information area 19 to "YES" before proceeding to step SA17.

Step SA16: Just as in step SA15, the main controller 21 controls the status information generating section 24 to produce voice data from the message associated with the status information of the print job in which the malfunction has occurred. Then, the main controller 21 causes the destination selecting section 26 to search the notification destination information (FIG. 6) held in the notification destination information area 18, thereby extracting the outside line number which is the second notification destination of the user of the print job in which the malfunction occurred. The extension number is used as a destination when the communication section 14 transmits the voice data indicative of the occurrence of malfunction to the outside line cellular phone 8b via the outside base station 6a. Then, the main controller 21 rewrites the second notification "NO" of the status information stored in the status information area 19 to "YES" before proceeding to step SA17.

Step SA17: The main controller 21 waits for the status code "6" (remedy information, FIG. 8) indicative of remedy from the malfunction from the printing section 13. If the status code "6" is outputted from the printing section 13, the main controller 21 proceeds to step SA20. If the status code is not outputted from the printing section 13, the main controller 21 proceeds to step SA18.

The main controller 21 controls its timer to count an elapsed time from when the communication section 14 transmits the malfunction occurrence information. If the elapsed time exceeds the notification time interval, the main controller 21 proceeds to step SA19. If the elapsed time is shorter than the notification time interval, the main controller 21 continues to wait, repeating the steps SA17 and SA18.

Step SA19: The main controller 21 adds "1" to the current value of notification level T in the notification level area, thereby increasing the level of urgency of the malfunction occurrence information. Then, the main controller 21 jumps back to step SA14 for executing steps SA14-SA19.

At this stage, the notification level T is equal to or greater than "2" and therefore the malfunction occurrence information is sent to a second device through which the malfunction occurrence information is outputted to the output destination, i.e., the user.

Step SA20: Just as in step SA2, the main controller 21 recognizes the status information as being the remedy information and rewrites the remedy information held in the status information area 19 to "YES," and then proceeds to step SA21.

Step SA21: Just as in step SA9, the main controller 21 initializes the notification level T of the malfunction occurrence information to "1," and then proceeds to step SA22.

Step SA22: If the program proceeds from step SA9 through steps SA11, SA14-SA17, SA20, and SA21, and if the malfunction occurs in the middle of printing (YES at step SA22), then the main controller 21 proceeds through steps SA7-SA10 where printing of image data held in the memory 16 is performed starting with the page that was saved at step SA11

If the program proceeds from step SA4 through SA12-SA17, SA20, SA21, and SA22, then the main controller 21 proceeds to step SA5 where the image data is produced from the print job held in the memory 16 and is printed as the main controller 21 proceeds through steps SA7-SA10.

As described above, when malfunction occurs, the status information notification processing is carried out. As a result, even though the extension cellular phone 8*a* which is the first notification destination is busy, the malfunction occurrence information may be sent to the second notification destination i.e., the outside line cellular phone 8*b* which is the second device carried by the user, thereby promptly recovering the printer from the malfunction.

This is because it is quite rare that two cellular phones carried by a person are busy simultaneously. In addition, wireless communication is connected more promptly in the outside line than in the extension.

In the first embodiment, the status information such as the malfunction occurrence information and print completion information have been described as being transmitted by telephone to the extension cellular phone 8*a* or the outside line cellular phone 8*b*. Alternatively, the message data (icons and/or characters) as the status information, produced in the status information generating section 24, may be sent to the extension cellular phone 8*a* or the outside line cellular phone 8*b* by email.

As described above, the notification destination information area 18 holds the notification destination information containing the first notification destination which is indicative of the first device, and the second notification destination which is indicative of the second device. The malfunction occurrence information is notified first to the extension cellular phone 8*a* which is the first device. After the notification level T has been increased above the output destination selecting level, the malfunction occurrence information is sent to the outside line cellular phone which is the second device. As a result, even though the extension cellular phone 8*a* is busy, the malfunction occurrence information may be sent to the outside line cellular phone 8*b* carried by the user, ensuring that the user of the print job is notified of the malfunction. This minimizes the period of time during which the printing is halted, and enables the image processing apparatus to perform printing more efficiently.

When the receiving section receives other print job before the malfunction is removed, if the user of the print job in which the malfunction has occurred is different from the user of the other print job, the malfunction occurrence information is sent to the outside line cellular phone 8*b* carried by the user of the print job in which the malfunction occurred, thereby reliably notifying to the user of the print job in which malfunction has occurred. This avoids delay of remedy from the malfunction and inconvenience to the users of other print jobs received during the malfunction.

Second Embodiment

Figure 16:
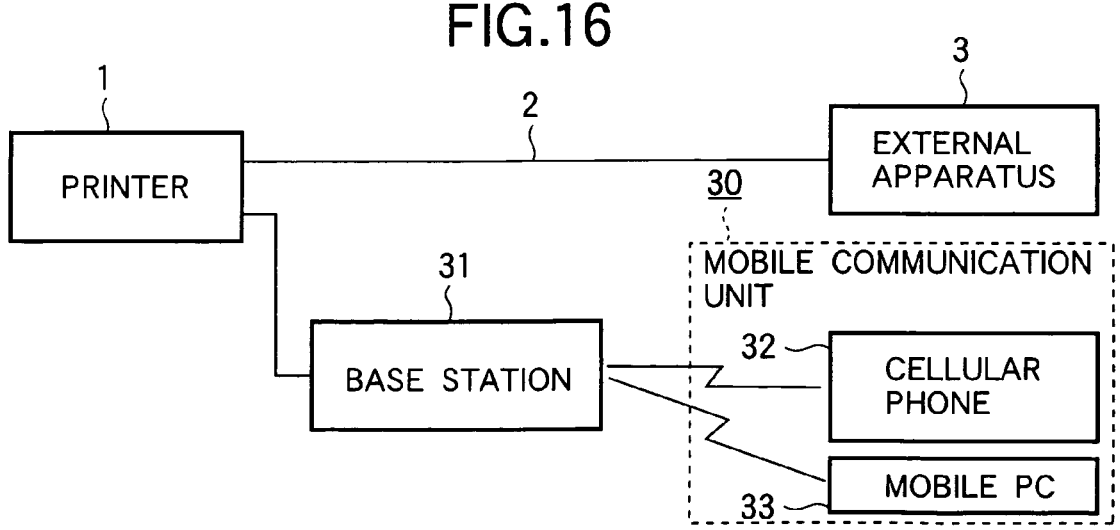
FIG. 16 illustrates an image processing system of a second embodiment.
Figure 17:
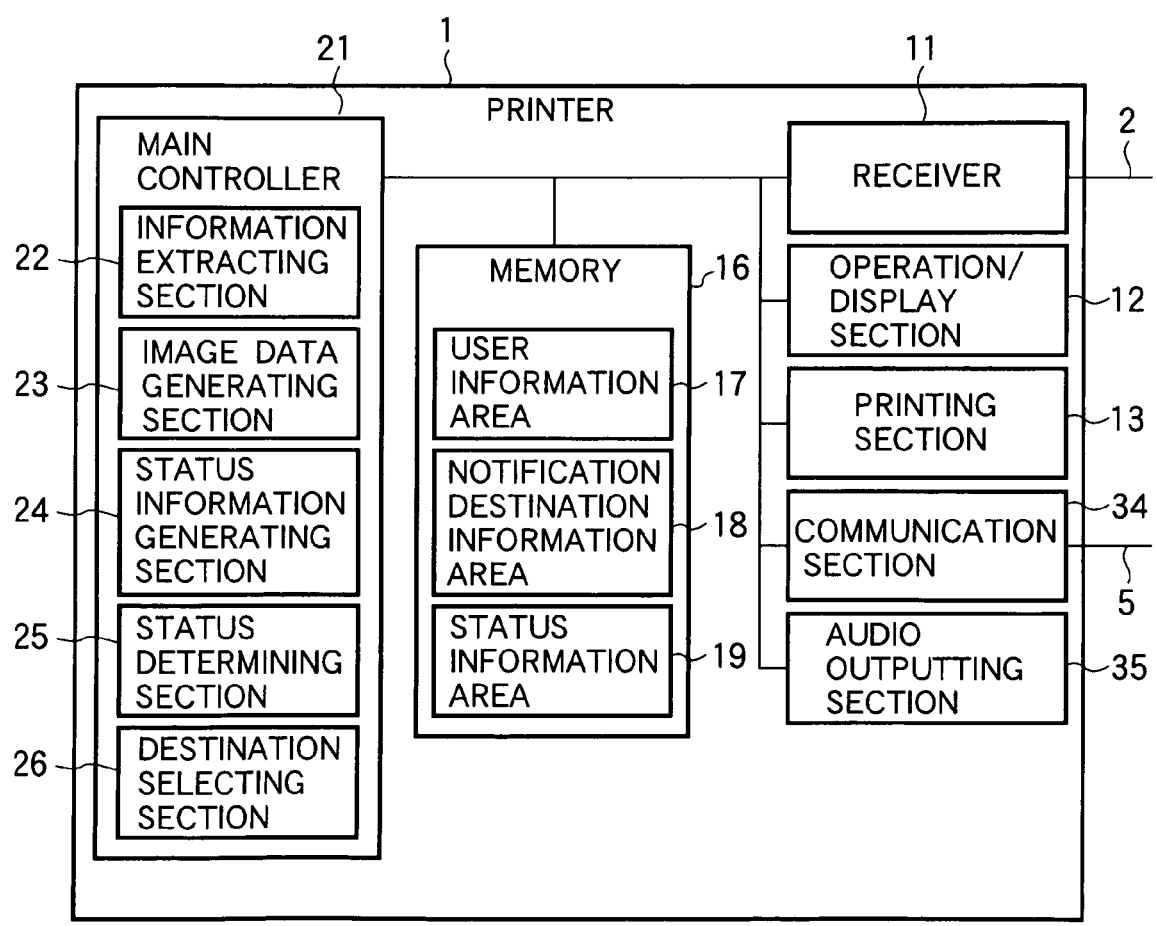
FIG. 17 is a block diagram illustrating the configuration of a printer.
Figure 18:
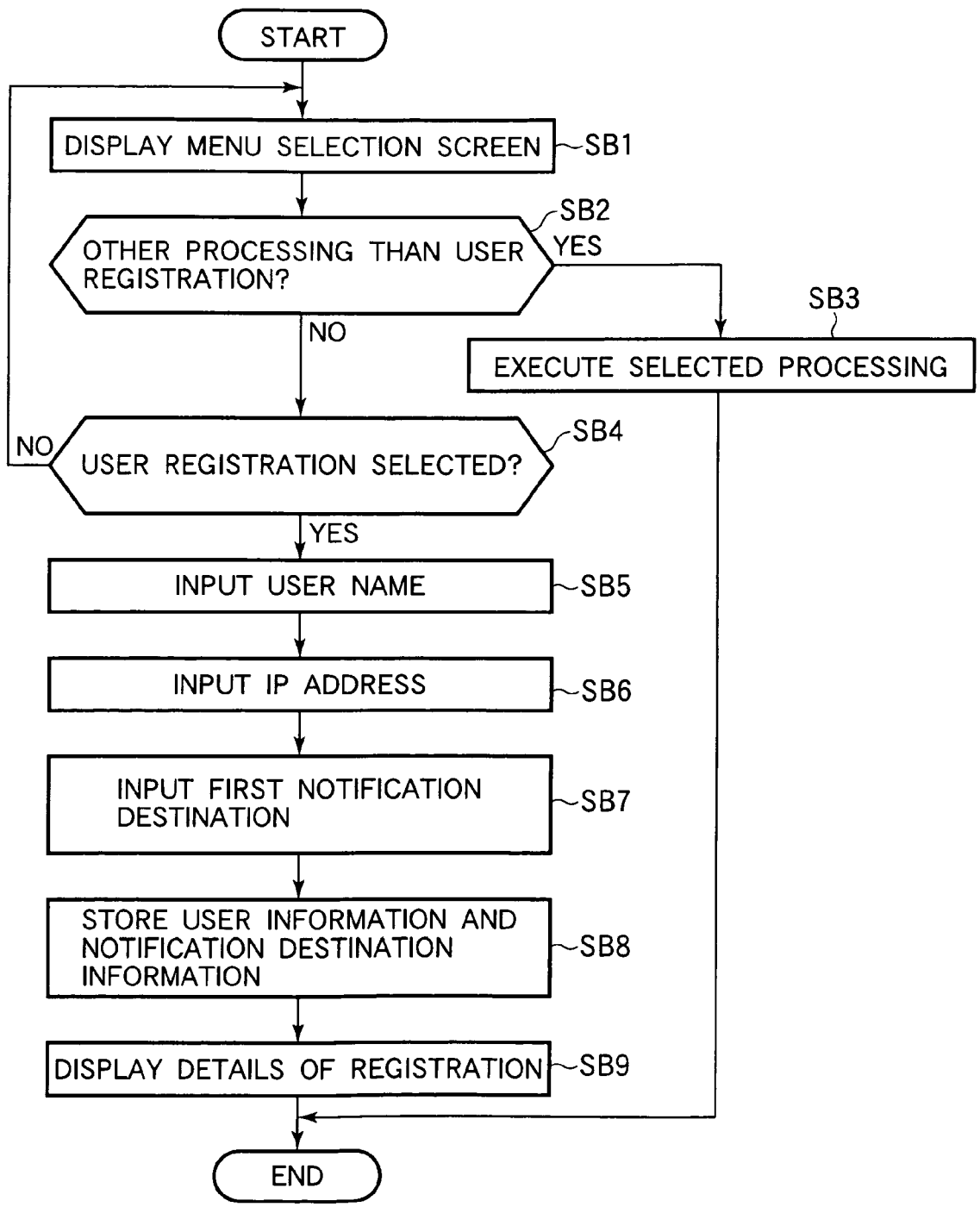
FIG. 18 is a flowchart illustrating a user registration processing.
Figure 19:
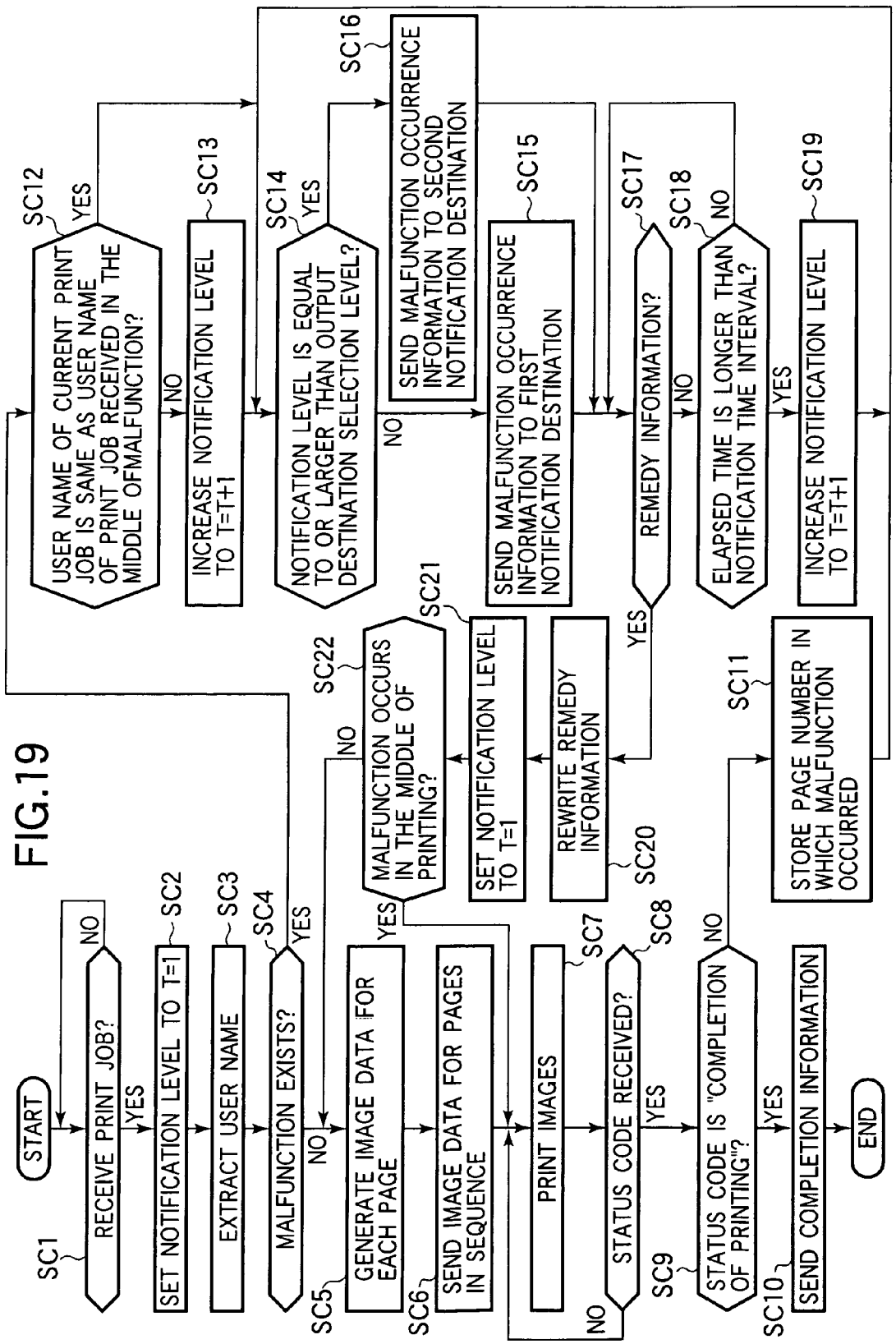
FIG. 19 is a flowchart illustrating a status information notification processing.

FIG. 16 illustrates an image processing system of a second embodiment. FIG. 17 is a block diagram illustrating the configuration of a printer 1. FIG. 18 is a flowchart illustrating a user registration processing. FIG. 19 is a flowchart illustrating a status information notification processing. FIG. 20 illustrates a second notification destination inputting screen. FIG. 21 illustrates a registration displaying screen of a second embodiment. FIG. 22 illustrates destination information.

Elements similar to those of the first embodiment have been given the same reference numerals and symbols, and their description is omitted.

Just as in the first embodiment, the printer 1 is connected to an external apparatus 3 via a network 2 and is also connected to a base station 31 (an extension base station or an outside line base station) so that the printer 1 can communicate with a mobile communication unit 30 including a cellular phone 32 (extension or outside line), which is a first notification destination, and a mobile PC 33.

Referring to FIG. 17, a communication section 34 transmits voice data to the cellular phone 32 via a telephone line 5 and the base station. The communication section 34 also transmits character data in the form of an email, which is status information, to the cellular phone 32 via the telephone line 5 and the base station 31.

The printer 1 also includes a voice outputting section 35 with, for example, a speaker. The voice outputting section 35 converts the message as the status information, generated by a status information generating section 24, into a voice message so that people near the printer 1 can hear the voice message. The voice outputting section 35 serves as a second notification destination.

The memory 16 holds a printing program that performs a user registration processing described with reference to FIG. 3 and a status information notifying processing described with reference to FIG. 4.

A memory 16 includes a user information area 17, a notification destination information area 18, and a status information area 19. The user information area 17 holds user information (FIG. 5) therein. The status information area 19 holds status information (FIG. 7) therein. The notification destination information area 18 holds notification destination information: the first notification destination which is the telephone number of the cellular phone 32 carried by the user who is the first output destination, and the second notification destination which is the voice outputting section 35. The voice outputting section 35 outputs a voice message to a speaker which in turn emits the voice message to people around the printer 1. The voice outputting section 35 and the speaker cooperate to function as the second device.

The memory 16 also includes a status code table (FIG. 8), a message table (FIG. 9), and notification level area. The notification level area holds an output destination selecting level ("2" in the second embodiment) and a notification time interval (3 minutes in the second embodiment), and counts the value of a notification level T just as in the first embodiment.

{User Registration Processing}

The user registration processing of the second embodiment will be described with reference to the flowchart illustrated in FIG. 18.

The steps SB1-SB6 are the same as steps S1-S6 of the first embodiment (FIG. 3), and their description is omitted.

Step SB7: The main controller 21 controls a operation/display section 12 to display a notification input screen containing messages that prompt the user to input a notification destination and an area in which associated contents as shown in FIG. 21 appear. The user operates the input keys on the operation/display section 12 to input the telephone number of the cellular telephone 32 which is a notification destination, and presses a key to confirm the telephone number.

Step SB8: The main controller 21 stores the inputted user name and IP address, which are user information, into a user information area 17, and inputted notification destination into the notification destination information area 18. In this manner, the user information and the notification destination information are registered.

Step SB9: The main controller 21 controls the operation/display section 12 to display the registration displaying screen in which the details of the registration as shown in FIG. 22 appear. The user checks the displayed information and confirms the displayed information by pressing an input key.

Upon completion of the user registration processing, the main controller 21 returns to step S1 where a menu selection screen (FIG. 10) is displayed. Then, the main controller 21 waits for the user to select a menu.

In this manner, the user registration processing of the second embodiment is carried out.

The status information notification processing of the second embodiment will be described with reference to a flowchart illustrated in FIG. 19.

The operations of steps SC1-SC10 are the same as those of steps SA1-SA10, and their description omitted.

Step SC11: Just as in step SA11, the main controller 21 extracts the message associated with the malfunction indicated by the received status code. Then, the main controller 21 displays the message on the display screen of the operation/display section 12, and stores into the memory 16 the page number of a page in which malfunction occurred in the middle of printing. Then, the main controller 21 stores the status information, for example, the user name of the print job, into the status information area 19 of the memory 16. Then, the main controller 21 proceeds to step SC14.

Step SC12: Just as in SA12, the main controller 21 controls the status determining section 25 to read the user name, extracted from the received print job in which the malfunction has occurred, from the status information stored in the status information area 19. Then, the main controller 21 compares the current user name with a user name (referred to "user name of other print job" hereinafter) extracted at step SC3 from a print job received in the middle of the malfunction. If the user names coincide, the main controller 21 determines that the users are the same person, and proceeds to step SC14.

If they do not coincide, it is determined that the user of the print job in which the malfunction has occurred is different from the other user, and the main controller 21 proceeds to step SC13.

Step SC13: The main controller 21 adds "1" to the current notification level T held in the notification level area in the memory 16, thereby increasing the urgency of the notification level T of the malfunction occurrence information. Then, the main controller 21 proceeds to step SC14.

Step SC14: The main controller 21 compares the notification level T held in the notification level area with an output destination selection level ("2" in the second embodiment) held in the memory 16. If the notification level T is smaller than the output destination selection level, the main controller 21 proceeds to step SC15. If the notification level T is equal to or larger than the output destination selection level, the main controller 21 proceeds to step SC16.

The value of the notification level T at SC14 is the same as that at SA14.

Step SC15: Just as in step SA15, the main controller 21 controls the status information generating section 24 to produce voice data for telephone, which is malfunction information, from the message associated with the status information of the print job in which the malfunction has occurred. Then, the main controller 21 controls the destination selecting section 26 to search the notification destination information (FIG. 6) held in the notification destination information area 18, thereby extracting the telephone number which is the first notification destination indicative of the user of the print job in which the malfunction occurred. The telephone number is used as a destination when the communication section 34 transmits the voice data indicative of the occurrence of malfunction to the cellular phone 32 via the base station 31. Then, the main controller 21 rewrites the first notification "NO" of the status information stored in the status information area 19 to "YES" before proceeding to step SC17. The operations of steps SC17-SC22 are the same as those of steps SA17-SA22 of the first embodiment.

As described above, when a malfunction occurs, the status information notification processing is carried out. As a result, even though the cellular phone 32, which is a first device through which the malfunction occurrence information is outputted to the user, is busy, the malfunction occurrence information may be sent to the voice outputting section 35, which is a second device through which the malfunction occurrence information is outputted to the user, so that the malfunction is promptly remedied.

In the second embodiment, the status information such as the malfunction occurrence information and print completion information by telephone are sent to the cellular phone 32 which is the first device. Alternatively, the message data as the status information, produced in the status information generating section 24, may be sent to the cellular phone 32.

As described above, the notification destination information area 18 holds the notification destination information: the first notification destination and the second notification destination for the user. The malfunction occurrence information is notified first to the cellular phone 32. After the notification level T has been increased above the output destination selecting level, the malfunction occurrence information is sent to the voice outputting section 35 which outputs a voice message to the speaker. As a result, even though the cellular phone 32 is busy, the malfunction occurrence information may be sent to the second device, ensuring that the user of the print job in which the malfunction occurred is notified of the malfunction. This minimizes the period of time during which the printing is halted, and enables the image processing apparatus to perform printing more efficiently.

While the image processing apparatus has been described in terms of a printer, the image processing apparatus may also be a FAX machine, a copying machine, or a multi-function peripheral, and the similar effects may be obtained.

What is claimed is:

1. An image processing apparatus, comprising:
a job receiving section that receives an image outputting job from an external apparatus;
an image outputting section that outputs an image based on the image outputting job;
a notification destination information memory that stores notification destination information including a first notification destination indicative of a first output device and a second notification destination indicative of a second output device;
a communication section that sends status information about the image outputting section to the first notification destination and the second notification destination;
wherein when the image outputting section is outputting the image, if the status information is outputted from the image outputting section, the communication section sends the status information to the first output device;
wherein if job receiving section receives another image outputting job when the status information exists, the communication section sends the status information to the second output device.

2. The image processing apparatus according to claim 1, wherein the status information is indicative of either completion of image outputting operation or occurrence of malfunction.

3. The image processing apparatus according to claim 2, wherein the first and second output devices are mobile communication units and the communication section sends the status information to the first and second output devices by email or by telephone.

4. The image processing apparatus according to claim 3, wherein the mobile communication unit is cellular phones.

5. The image processing apparatus according to claim 1, further comprising a voice outputting section that outputs the status information in the form of a voice output; wherein the first output device is a mobile communication unit and the second output device is the audio signal outputting section and the communication section sends the status information to the first output device by email or by telephone and to the second output device by voice output.

6. The image processing apparatus according to claim 1, wherein the first and second output devices are mobile communication units and the communication section sends the status information to the first and second output devices by email or by telephone.

7. A method for notifying status information of an apparatus, comprising:
receiving image processing information from an external apparatus;
processing the image processing information in an image processing section;
storing notification destination information by which the status information is to be notified;
notifying the status information using the notification destination information when a change of status of the apparatus has occurred; and
notifying the status information again after another image processing information is received from the external apparatus and the change of status of the apparatus remains unsolved.

8. The method according to claim 7,
wherein the notification destination information includes first notification destination information indicative of a first notification destination and second notification destination information indicative of a second notification destination; and
wherein the method further comprises:
notifying the status information using the first notification destination information when the status of the apparatus has changed; and
notifying the status information using the second notification destination information if the change of status of the apparatus has not been solved.

9. The method according to claim 8, wherein the status information indicates one of completion of the processing of the image processing information and occurrence of a malfunction in the apparatus during processing of the image processing information.

10. The method according to claim 8, wherein the first notification destination information indicates the external apparatus from which the image processing information is received.

11. The method according to claim 8, wherein
the first and second notification destination information are associated with a same user, and
the first and second notification destination information are different from each other.

12. The method according to claim 11, wherein
the first notification destination is a first mobile terminal and the second notification destination is a second mobile terminal, and
the first mobile terminal receives the status information by way of an email and the second mobile terminal receives the status information by way of a telephone call.

13. The method according to claim 8, wherein a first user outputs first image processing information to the apparatus whose status has changed during processing of the first image processing information, and a second user outputs second image processing information to the apparatus after the first use has outputted the first image processing information, the first user being different from the second user.

* * * * *